Dec. 21, 1965         S. I. WEISSMAN         3,225,307
            OPTICAL MASER USING A LIQUID RARE-EARTH CHELATE
Filed Feb. 12, 1962                          2 Sheets-Sheet 1

INVENTOR
SAMUEL I. WEISSMAN

James H. Ryan

BY

ATTORNEY

Dec. 21, 1965  S. I. WEISSMAN  3,225,307
OPTICAL MASER USING A LIQUID RARE-EARTH CHELATE
Filed Feb. 12, 1962  2 Sheets-Sheet 2

*INVENTOR*
SAMUEL I. WEISSMAN

BY *James H. Ryan*

ATTORNEY

United States Patent Office 3,225,307
Patented Dec. 21, 1965

3,225,307
OPTICAL MASER USING A LIQUID
RARE-EARTH CHELATE
Samuel I. Weissman, St. Louis, Mo.
(6926 Princeton, University City, Mo.)
Filed Feb. 12, 1962, Ser. No. 172,707
5 Claims. (Cl. 331—94.5)

This invention relates to, and has as its principal object provision of, a continuously operating optical maser, i.e., a "laser," using an improved type of active material in the liquid state of matter.

As shown, for example, by the Schawlow et al. U.S. Patent 2,929,922 and the Schawlow article "Optical Masers," Scientific American, Vol. 204, pp. 52 et seq. (June 1961), masers are a new device useful in a variety of applications such as amplification, oscillation, etc., over a very wide band of electromagnetic frequencies including the visible. Heretofore, the active materials employed in masers, i.e., the negative temperature media, have been in either the gaseous or the solid state. In general, they provide monochromatic radiation in excellent collimation and coherence but are few in number. Hence masers thus obtained can be tuned only over a very restricted output range.

It has now been discovered that certain members of a family of organo-inorganic compounds can be employed as the negative-temperature media for use in masers and that, because of variations available within this family, they permit ready tuning of the output frequency of the assembled device. This family comprises the organic chelates of the rare earth metals of the lanthanide series. Masers employing such materials, active in the frequencies of ultraviolet, visible and infrared radiation, operate with the negative-temperature media in solution at atmospheric pressure and at temperatures ranging from room temperature down to that of solid carbon dioxide or even below.

The term "chelates," for the purpose of this invention, designates those cyclic structures which arise from the union of metallic atoms with organic molecules or ions. Chelates of the type useful for the purpose of this invention include those of lanthanide rare-earth metals, particularly samarium, europium, terbium and ytterbium, with such ligands as benzoylacetone, dibenzyol methane, trifluoroacetylacetone, hexafluoroacetylacetone, thenoyl trifluoroacetone, salicylaldehyde, 8-hydroxyquinoline, nitrotriacetic acid, ethylene diaminotetraacetic acid, etc. These chelates are readily obtained by reaction of a rare-earth metal halide, e.g., the readily available chloride, and the ligand in a water-dioxane medium with the pH controlled with dilute base to a point below which the corresponding rare-earth metal hydroxide would form. A further method involves the mixing of a rare-earth metal salt containing a minimum amount of water with the ligand in a lower alkanol, e.g., methanol or ethanol, in the presence of a weak base. The chelates formed may contain up to two molecules of bound water per molecule of the complex. Depending on the specific ligand, the chelates of the above listing are bidendate, tridendate, hexadendate, etc.

Chelates can be prepared specifically by methods described in the literature. Aqueous media for chelates of metals with 1,3-diketones as ligands have been described in Moeller, "Inorganic Syntheses," McGraw-Hill, N.Y., Vol. 5, pages 105–107 and specifically for praseodymium, neodymium, samarium, holmium and erbium acetylacetone chelates by Moeller and Ulrich, J. Inorg. Nucl. Chem. 2, 164 (1956). A specific preparation for neodymium acetylacetonate involves dissolving neodymium oxide in a slight excess of hydrochloric acid. From 3 g. of the oxide, 100 ml. of the chloride solution was obtained. This was added to 6 g. of acetylacetone in 50 ml. of water and 50 ml. of dioxane. The pH was adjusted to 6.5 by the addition of dilute ammonium hydroxide and the mixture stirred for 12 hours with occasional addition of more ammonium hydroxide. The neodymium acetylacetonate precipitated as pink crystals which were washed in water, ethanol, and dried over magnesium perchlorate. The material was added to benzene, and the undissolved material removed. Reducing the filtrate volume by evaporation followed by cooling gave crystals of the pure chelate (M.P. 144–5° C.).

In a similar manner, a specific chelate, neodymium dibenzoylmethane, was prepared by addition of 100 ml. of the aqueous chloride solution (prepared as above) to 13.5 g. of dibenzoylmethane in 50 ml. of dioxane and 25 ml. of water. With pH maintained at 6.5, a crystalline chelate formed, which after recrystallization from benzene, gave neodymium dibenzoylmethane (M.P. 144–6° C.) as the tris-chelated form. By the same general conditions with equivalent amount of thenoyltrifluoroacetone and using a pH of 6.3, the corresponding chelate was obtained. The chelates of neodymium with salicylaldehyde and acetoacetic ester also form by use of this general process, but in lower yields.

Praseodymium acetylacetonate, samarium acetylacetonate, dysprosium acetylacetonate, and holmium acetylacetonate are also obtained by the above general procedure.

Europium trichloride (20–40 mg.) in 3 ml. water was buffered to pH of 5–6 by sodium acetate and 7 ml. of thenoyltrifluoroacetone in ether was added. After shaking, the ether layer was separated. Addition of petroleum ether to the ether solution gave crystals of the europium thenoyltrifluoroacetone chelate.

Non-aqueous techniques are also useful for the preparation of the chelates. Rare earth oxide (0.6 g.) was converted to the chloride by treatment with conc. HCl followed by evaporation to dryness. To the residue was added 3 g. of dibenzoylmethane in 300 ml. of absolute ethanol containing 2 ml. of piperidine. Evaporation to about 100 ml. gave crystals of the chelate which can be recrystallized by solution in 50 ml. of acetone followed by addition to absolute ethanol. When tribenzoylmethane is used in place of the dibenzoylmethane, the chelates with Sm, Gd, Dy, Tb, Tm, and Eu are also obtainable. A useful technique for the chelates of benzoylacetone involves preparation of the sodium salt of the latter in xylene followed by reaction with the rare earth chloride. Ytterbium dibenzoylmethane results from the reaction of the ytterbium chloride in alcohol with dibenzoylmethane and piperidine in alcohol.

For the purpose of this invention, chelates free of contaminants, e.g., other metals, are particularly preferred.

As noted, the chelates are employed in liquid solution in the immediate invention. The solvents employed are liquid organic materials inert to the chelate and include methanol, ethanol and the like. A chelate concentration of about $10^{-4}$ or $10^{-5}$ molar is generally satisfactory but higher or lower concentrations can be used.

The operation of the invention will be understood in more detail from a consideration of the drawings, in which.

Figure 1:
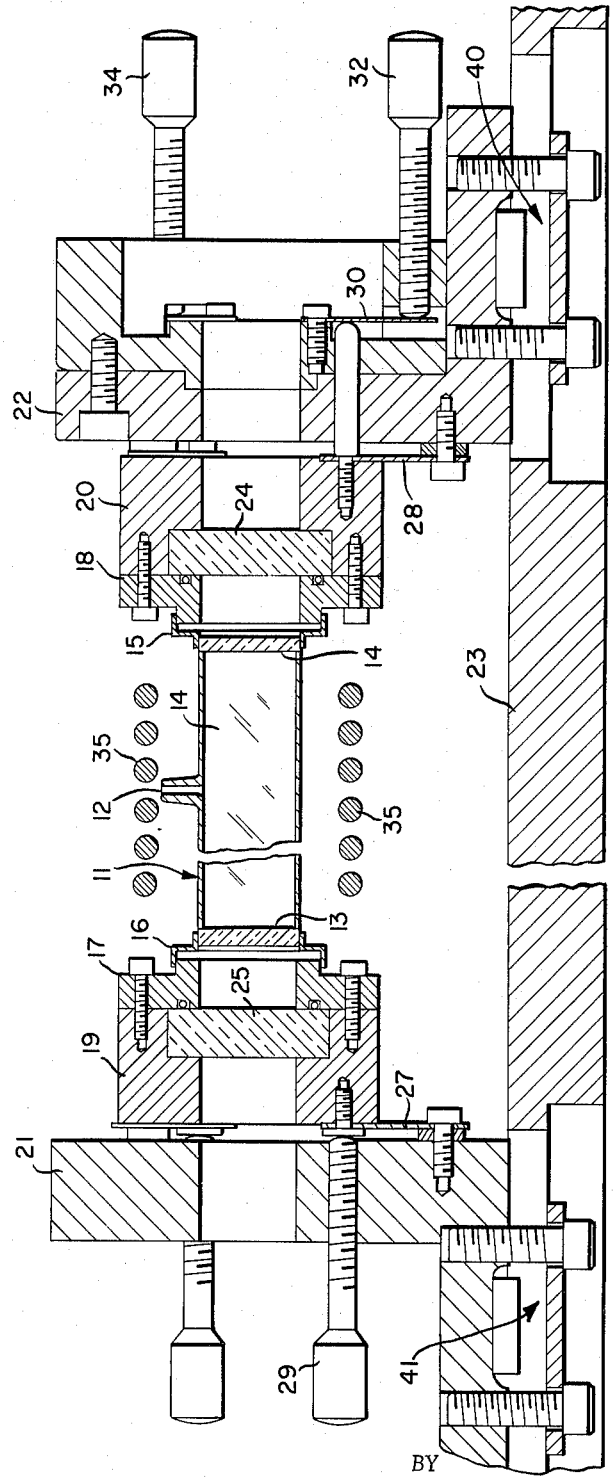
FIGURE 1 is a longitudinal section of a maser device which can employ organic chelates of rare earth metals in solution as the active media.
Figure 2:
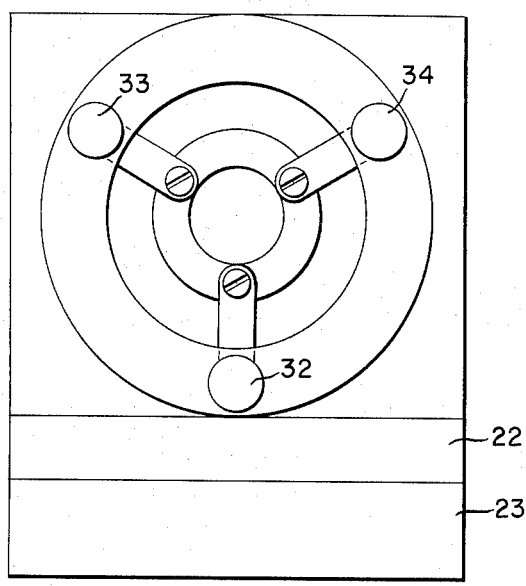
FIGURE 2 is a right end view of the apparatus of FIGURE 1.

In the drawings is shown a hollow cylindrical chamber 11 formed of annealed low expansion glass. An opening, 12, permits filling the chamber 11. The ends of the chamber 11 are lapped flat and optically parallel within a fraction of a wavelength of the emitted light. Optically flat and plane-paralleled windows 13 and 14 ground to the same degree of optical perfection form the end windows of chamber 11. The chamber is affixed by any convenient means (15 and 16) to brackets 17 and 18 screwed into housing 19 and 20 in turn mounted by L brackets 21 and 22 on base plate 23 through key and bolt arrangements 40 and 41. Within respective housing 19 and 20 are reflective coated Fabry-Perot interferometer plates 24 and 25 accurately adjusted by means of bar springs 27, 28 and 30 and micrometer screws 29 and 32. Actually three micrometer screws 32, 33 and 34 are used to adjust each plate as shown in FIGURE 2.

In operation, ultraviolet light from a source 35 which can be coaxial with chamber 11 is admitted into the chamber through the glass forming the chamber into the organic solution of the organic chelate. Through the pumping effect resulting from the ultraviolet light and the energy interchange between the rare-earth metal ions and its ligand, the output stimulated emission emerges through the Fabry-Perot plates.

Figure 3:
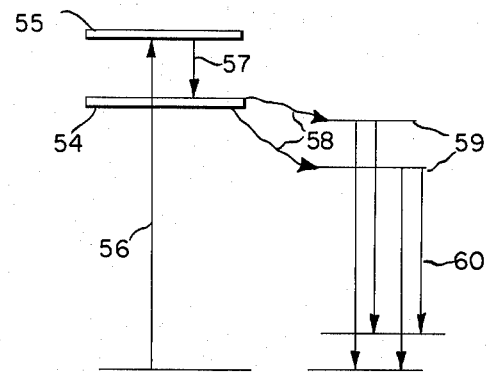
FIGURE 3 is an energy-level diagram illustrating the functioning of the rare-earth chelate in the maser.

The interaction of the various components of the system is illustrated by FIGURE 3 where Singlet $\pi$ and Triplet $\pi\pi$ absorption bands of the organic ligand are denoted by 55 and 54, respectively. The organic ligand is excited by the ultraviolet transition, 56, followed by transition 57, to the metastable Triplet state, 54. Intramolecular energy transfer by a radiationless process, denoted by transition 58, excite the rare-earth ion to a level or levels 59. Stimulated emission takes place from the excited level or levels 59 to the ground state multiplet of the rare-earth ion by means of transitions 60.

The organic ligand portions of the present rare-earth chelates have broad absorption bands in the ultraviolet region of the electromagnetic spectrum. The oscillator strengths of these absorption bands are usually near unity or of the order of $10^4$ to $10^6$ times greater than those of the absorption lines of the rare-earth ions. The radiation absorbed by the organic ligand excites the rare-earth ion by intramolecular energy transfer with a quantum efficiency of nearly unity. Therefore, the rare-earth ion in the organic chelate has an oscillator strength in absorption of the order of $10^4$ to $10^6$ times that of the free rare-earth ion. The rare-earth ion then emits its characteristic fluorescence. It is the stimulated emission of this line fluorescence which yields the coherent output radiation from the optical maser. Since the rare-earth organic chelates have strong ultraviolet absorption bands and efficient intramolecular energy transfer, a relatively small quantity of incident ultraviolet radiation is needed to establish a sizable inverted population. Much larger quantities of incident radiation would be necessary to excite the rare-earth ion directly. Hence, the rare-earth organic chelates exhibit improved properties relative to present optical maser materials incorporating rare-earth ions.

In a specific illustrative embodiment of the present invention, europium benzoylacetonate, i.e. (1-phenyl-1,3-butanediono europium (III)), is present to the extent of about $10^{-4}$ or $10^{-5}$ molar concentration in ethyl alcohol. As pointed out, the solution is contained within a chamber whose end plates are reflective to the fluorescent radiation of the rare-earth ion and whose sides are transparent to ultraviolet radiation. The rare-earth organic chelate is optically pumped by mercury vapor lamps arranged about the chamber. The rare-earth ion is excited by means of an efficient intramolecular energy transfer. The excited rare-earth ion fluoresces and the reflective end plates allow the axial modes of oscillation to increase in intensity by stimulated emission.

In operation, the europium benzoylacetonate molecule is excited by absorption of radiation in the region of 3250 A. and emits fluorescence at 5792 A., as well as in the region of 5920 A. and 6140 A. This fluorescence is assigned to transitions $5_{D_0} \rightarrow 7_{F_0}$, $5_{D_0} \rightarrow 7_{F_1}$ and $5_{D_0} \rightarrow 7_{F_2}$ of the europium 3 anion. The transition $5_{D_0} \rightarrow 7_{F_2}$ is the most intense and furnishes the stimulated output beam. By choice of metal with other ligands, the specific frequencies of absorption and emission will undergo some variation from these specific wave regions.

Since obvious modifications and equivalents in the invention will be evident to those skilled in the art, I propose to be bound solely by the appended claims.

The embodiments of the invention in which an exclusive property or privilege is claimed are defined as follows:

1. In an optical providing a housing adapted to contain a liquid and providing a resonant optical cavity for light emitted from the liquid, a liquid solution of a chelate of a rare-earth metal of the lanthanide series disposed in said housing, a source of activating light, means admitting said light to the solution to excite the chelate molecules in said solution thereby stimulating the emission of fluorescent light, and means permitting egress of said stimulated light.

2. The maser of claim 1 wherein the rare-earth metal is europium.

3. The maser of claim 1 wherein the rare-earth metal is terbium.

4. The maser of claim 1 wherein the liquid solution of the rare-earth metal chelate is in a lower alkanol.

5. In an optical maser providing a housing adapted to contain a liquid and providing a resonant optical cavity for light emitted from the liquid, a liquid solution of europium benzoylacetonate chelate in ethanol disposed in said housing, a source of ultraviolet light, means admitting the ultraviolet light to the chelate, and means permitting egress of stimulated light.

No references cited.

JEWELL H. PEDERSEN, *Primary Examiner.*

UNITED STATES PATENT OFFICE
CERTIFICATE OF CORRECTION

Patent No. 3,225,307                          December 21, 1965

Samuel I. Weissman

It is hereby certified that error appears in the above numbered patent requiring correction and that the said Letters Patent should read as corrected below.

Column 4, line 33, after "optical" insert -- means --.

Signed and sealed this 18th day of October 1966.

(SEAL)
Attest:

ERNEST W. SWIDER                        EDWARD J. BRENNER
Attesting Officer                             Commissioner of Patents